Sept. 17, 1963 R. A. NEUSCHOTZ 3,103,962
SELF-LOCKING THREADED INSERT
Filed Nov. 29, 1960
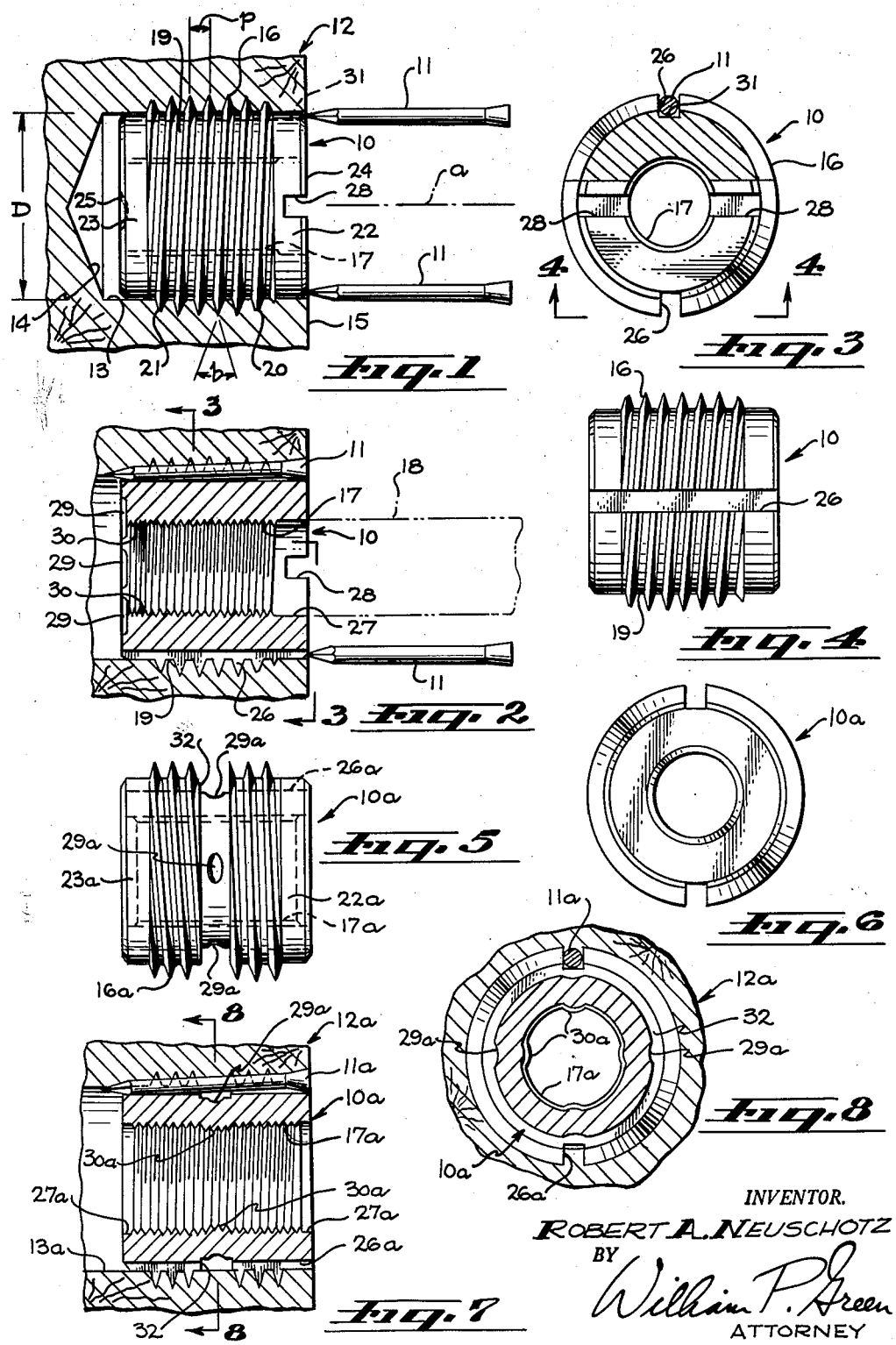
INVENTOR.
ROBERT A. NEUSCHOTZ
BY William P. Green
ATTORNEY ３,103,962
SELF-LOCKING THREADED INSERT
Robert A. Neuschotz, 1162 Angelo Drive,
Beverly Hills, Calif.
Filed Nov. 29, 1960, Ser. No. 72,426
2 Claims. (Cl. 151—41.73)

This invention relates to improved threaded inserts of a type adapted to be screwed into a recess or hole in an outer carrier part, typically for the purpose of providing a fastener structure in the carrier part to which a coacting stud or bolt may be removably connected.

A device embodying the invention includes an insert body having external threads adapted to threadedly engage the inner surface of a hole or recess into which the insert is connected. In combination with this body, I employ one or more (preferably two) locking keys or elements, adapted to be driven into locking interengagement with the insert and the carrier part after the insert has been screwed into its desired position within the recess. For receiving each locking element, the insert body has along its outer surface a groove, extending axially through the external threads of the device, and into which the locking key is driven axially after the insert has been screwed into position. The locking element is so dimensioned as to engage and cut through the material of the carrier part, as the key is driven into its locking position, to thereby positively retain the insert against rotation relative to the carrier part, and thus lock the insert in its installed position. In addition to the external threads on the insert body, the latter also desirably has internal threads, into which a coacting stud or bolt may be connected, to thus complete connection of the stud or bolt to the carrier part through the medium of the insert.

When an insert of the above discussed general type is to be employed in wood or other similar relatively weak material, certain rather perplexing problems are encountered which are not met when the carrier part is formed of a harder material such as metal. For instance, when the carrier part is of wood or the like, the threads of the insert have the tendency of axially spreading or expanding the wood in a manner causing it to bulge axially about the exposed end of the insert. Further, the driving of the locking key or keys into the material of the carrier part, adjacent the insert, causes additional deformation of the wood or other similar soft material of the carrier part, to add to the distortion of that part about the insert.

A major object of the present invention is to provide an insert structure which is in certain respects especially effective for use in wood or the like, and which in particular will overcome the above discussed problems which normally occur in connection with the application of inserts to wood. A device embodying the invention is purposely constructed to minimize the deformation of the wood about the exposed end or ends of the insert, while at the same time attaining an optimum locking action when the locking keys are driven into active position.

In order to achieve this result, the external threads on the insert body are purposely terminated at a location spaced from the axially outer end of the insert. There is then provided at that axially outer end a short externally unthreaded portion of the insert body, which is preferably of cylindrical configuration. This clindrical unthreaded surface may be of a diameter corresponding approximately to the root diameter of the external threads on the insert body. The key receiving groove extending along the outer surface of the insert extends axially through at least a portion of the external threads, and then continues axially outwardly beyond those threads and through the unthreaded portion or surface at the end of the body. Preferably, a similar unthreaded surface is provided at the opposite or axially inner end of the insert, to prevent bulging at that location and to serve as a pilot for centering the insert during installation. The groove may then extend axially through the entire extent of the threads, and through both of the unthreaded end surfaces. In the optimum form of the invention, the locking key or keys take the form of short nails, typically of the type commonly referred to as "brads."

In one form of the invention, a transverse screw-driver slot or reces is provided at the axially outer end of the insert, for screwing the insert into its active position in the carrier part. This screw-driver slot preferably extends into, but desirably not beyond, the externally unthreaded outer end portion of the insert body. Internally, the insert body has threads for engaging a coactive stud, but these threads also are desirably terminated at a location spaced from the axially outer end surface of the insert body. When a screw-driver slot is provided, a particular feature of the invention resides in the positioning of that slot at a location which is offset circularly from the axial key receiving groove or grooves, so that the screw-driver slot can not interfere with proper guiding of a key into its associated groove as the insert is being locked in place in a carrier part.

In anoher form of the invention, the external threads of the insert are interrupted by an annular external groove extending about the insert body, with the material of the insert being locally swaged or deformed at the location of this groove to provide a self-locking action of the internal threads with respect to an engaged stud.

The above and other features and objects of the present invention will be better understood from the following detailed description of the typical embodiments illustrated in the accompanying drawing in which:

FIG. 1 is a sectional view showing an insert embodying the invention positioned in an outer carrier part;

FIG. 2 is a view similar to FIG. 1, but showing the insert as well as the outer carrier part in axial cross section, and showing one of the locking keys in its locking position, with the other locking key as it appears before being driven into active position;

FIG. 3 is a view of the insert taken on line 3—3 of FIG. 2, but with the outer carrier part being deleted from FIG. 3;

FIG. 4 is a side view taken on line 4—4 of FIG. 3;

FIG. 5 is a view similar to FIG. 1, but showing a variational form of the invention;

FIG. 6 is an end view of the FIG. 5 insert;

FIG. 7 is an axial sectional view showing the FIG. 5 insert as it appears when installed in a carrier part, and with one of the two locking keys in active position; and FIG. 8 is a transverse section taken on line 8—8 of FIG. 7.

The first form of the invention, shown in FIGS. 1 through 4, includes an insert body 10 and two locking keys 11 for securing the body in its active position within a carrier part 12. The latter may typically be formed of wood, and contains a recess or hole 13 extending into the material of the carrier part from an outer surface 14 of the part. Recess 13 may initially be a straight cylindrical bore, centered about axis $a$ in FIG. 1, and of a diameter corresponding to that designated at D in FIG. 1. The bore 13 may either extend enitrely through the thickness of part 12, or extend only partially through that thickness to form a blind hole or recess terminating at an inner end surface 14. The outer exposed surface 15 of part 12, which surface extends about the axially outer end of recess 13, is desirably disposed transversely of the previously mentioned axis $a$.

The main body 10 of the insert is normally formed of a suitable metal, such as steel, which of course has considerably greater strength than the wood or other relatively weak material of carrier part 12. Insert 10 has external threads 16 which engage the carrier part, and has internal threads 17 (see FIG. 2) into which there may be connected an externally threaded stud represented at 18 in FIG. 2. The external thread 16 may be of a somewhat modified cross sectional configuration, as shown, and in particular may taper radially outwardly more gradually than does a standard thread in which the included angle between the opposite sides of the thread is 60°. This included angle (angle $b$ in FIG. 1), should be substantially less than 60°, and preferably about 40°. Also, it is found desirable that the external threads 16 have a modified root diameter, to present a surface 19 of cylindrical curvature between successive turns of threads 16. Surface 19 desirably is of a diameter corresponding to, or slightly smaller than, that represented at D in FIG. 1. It is also noted that threads 16 may be chamfered slightly at their opposite axial ends, typically about 20°, as is brought out clearly at 20 and 21 in FIG. 1.

Axially outwardly and axially inwardly of threads 16, insert 10 has two unthreaded cylindrical external surfaces 22 and 23, both of the diameter represented at D, or slightly smaller than that diameter. Each of these surfaces 22 and 23 desirably has an axial extent at least about half as great as the axial pitch distance $p$ between successive turns of threads 16. The end surfaces 24 and 25 of insert 10 desirably extend directly transversely of axis $a$, with outer end surface 24 being in most instances substantially flush with outer surface 15 of carrier part 12 in the completely installed position of the insert.

For receiving locking keys 11, insert 10 has at two diametrically opposite locations a pair of external grooves 26, extending axially along the entire length of the insert body. These grooves may have the rectangular cross sectional configurations illustrated in FIG. 3. The grooves are preferably deep enough to extend radially into the material of insert body 10 inwardly beyond the root diameter of the threads, and therefore beyond cylindrical surfaces 19, 22 and 23. Grooves 26 thus are continuous through the entire axial extent of threads 16, and continue beyond those threads through the axial extents of both of the cylindrical surfaces 22 and 23.

Locking keys 11 may take the form of small brads having points at their axially inner ends, and small heads at their axially outer ends, and of a length to extend the entire length of grooves 26 between the opposite end surfaces 24 and 25 of the insert. The dimensions of grooves 26, in cross section, are of course large enough to receive the brads 11.

Internal threads 17 within the insert are usually much smaller and finer threads than are external threads 16. These threads 17 preferably terminate axially outwardly at a point spaced from the outer end surface 24 of the insert, to leave an internal cylindrical unthreaded surface 27 in the end portion of the insert, and radially opposite the external unthreaded surface 22. For facilitating the installation of the insert into carrier part 12, there is provided at the axially outer end of the insert, a transverse screw-driver slot or recess 28, which is of course interrupted by the central hole extending through the insert. This slot 28 should for best functioning of the device be offset circularly with respect to the two axial grooves 26, the degree of offset typically being 90° as shown in FIG. 3. Screw-driver slot 28 may have the rectangular cross sectional configuration shown in FIG. 2, and extends into the portion of the insert which is internally and externally unthreaded, but preferably does not extend beyond that unthreaded portion and into either the internal or external threads of the insert.

At the axially inner end of the insert, I find it desirable to deform or swage the unthreaded portion 23 of the insert axially inwardly, very slightly, at certain localized areas 29, to thus slightly deform the internal threads at 30 (FIG. 2), in a manner producing a self-locking action with stud 18 serving to frictionally lock the stud in the insert.

To now describe the manner of use of the insert arrangement shown in FIGS. 1 through 4, assume first of all that the carrier part 12 initially contains an unthreaded bore 13 of the diameter D. The first step in installing insert 10 in this hole is to slip the inner unthreaded portion 23 of the insert into the axially outer end of bore 13. This inner portion of the insert serves as a pilot portion for assuring proper initial positioning of the insert in the bore. The operator then positions a screw-driver within screw-driver slot 28, and actuates the tool to screw the insert into part 12. External threads 16 on the insert serve to automatically form mating threads in part 12, to form a positive threaded interengagement between the insert and the carrier part. The installing action is continued until insert 10 reaches the position illustrated in FIG. 1, at which time the brads 11 are utilized for locking the insert in this position. Each brad is first moved to a position in which its inner pointed end is received within the small exposed axially outer end portion of one of the grooves 26 (the portion between inner wall 31 of the groove and cylindrical surface 13 of the carrier part). The point of the brad is small enough to be received in the small exposed portion of the groove. The brad is then driven or pressed axially inwardly, by a hammer or suitable pressing tool, to the position of the upper brad in FIG. 2. As the brad is driven into position, it forces its way through the threads of carrier part 12, and thus moves into an interfitting relationship with respect to the material of the carrier part in a manner positively locking the insert against rotary movement relative to the carrier part. This locking action is also attained at the locations of the unthreaded portions of carrier part 12, at opposite ends of threads 16. In this connection, it is noted that the narrow or sharp cross sectional configuration of threads 16 causes these threads to cut into the material of the carrier part with a slicing action, and without actually removing any of that material at the locations at which threads are formed. Instead, the material of part 12 is merely spread apart by threads 16, and after threads 16 have passed axially inwardly beyond the location of the unthreaded surface designated 13 in FIG. 1, the material of the carrier part moves back together to close up the previously formed threads at that location.

It is found in actual practice that the provision of the unthreaded external surfaces 22 and 23, and the unthreaded internal surface 27, is of considerable importance in maximizing the effectiveness of the present insert for use in wood or other relatively soft material. The external unthreaded surfaces prevent axial bulging of the material of part 12, a feature of particular importance at the axially outer end of the insert for preventing axial bulging of part 12 about the exposed end of the insert. Also, the axially inner unthreaded surface 23 serves as a pilot portion of the insert, as discussed. Further, the formation of screw-driver slot 28 within only the unthreaded portion of the insert prevents the screwdriver slot from interfering with proper formation of the threads in the insert. The positioning of the screwdriver slot at a location offset circularly from grooves 26 prevents the screw-driver slot from interfering with the proper driving of the brads into the small exposed portions of grooves 26. If the screw-driver slot were positioned in alignment with one of the grooves 26, then the point of the brad upon initial insertion into the groove would tend to move into the screw-driver slot rather than the groove, and thus would not be directed by the groove into its proper locking position.

FIGS. 5 through 8 show a variational form of the invention including an insert body 10a adapted to be screwed into a carrier part 12a, and to be retained therein by brads 11a. These parts may be considered as identical with the corresponding parts of FIGS. 1 through 4, except in the respects specifically discussed below.

In the second form of the invention, the external threads 16a are interrupted at an axially central location by an annular groove 32, which may extend radially inwardly slightly deeper than axial grooves 26a. The material of the insert is swaged inwardly slightly within groove 32 at one or more locations 29a, to provide self-locking deformed portions 30a of the internal threads 17a. The insert 10a is adapted to be installed in bore 13a of carrier part 12a with either end of the insert projecting into the bore first. Consequently, the unthreaded surfaces 22a and 23a, corresponding to surfaces 22 and 23 of FIG. 1, may be identical, and there may be short internal unthreaded surfaces 27a at both ends of threads 17a.

The insert of FIGS. 5 through 8 is installed by means of a suitable insert installing tool, of any of the various known types, and because of this method of installation does not require screw-driver slot 28. The tool is actuated to screw the insert to the FIG. 7 position in carrier part 12a following which studs 11a are driven into the two grooves 26a to lock the insert in position.

I claim:
1. An element for connection into a recess in a carrier part comprising a body having external threads for engaging said carrier part, said body having two essentially annular unthreaded external surfaces adjacent the axially outer and axially inner ends respectively of the body and located axially outwardly and axially inwardly respectively of said external threads, said two unthreaded surfaces being essentially cylindrical and of a diameter approximately equal to the root diameter of said external threads, said body having a first groove extending axially along the outer surface thereof, said groove extending into the material of said body to a depth radially inwardly beyond said root diameter of the threads at the location of said threads and at the location of said two unthreaded surfaces to interrupt both the threads and the unthreaded surfaces, said groove being accessible and open at both ends of the body for axial reception of a locking key to be driven in either direction along the groove axially past the location of one of said unthreaded surfaces and to the location of said threads, said body having internal threads therein for engagement with a coacting stud, said body having an annular external second groove formed therein at a location axially between the opposite ends of said external threads and dividing said external threads into two spaced groups of turns, said annular second groove intersecting said first groove and extending into the material of the body at least as deeply as the first groove to divide it into two axially aligned portions at opposite sides of the second groove, the material of said body being locally swaged radially inwardly at the location of said annular second groove to attain a self-locking action with said stud, said axially extending groove continuing along the entire axial length of said body to form a way for reception of said locking key extending successively throug a first of said unthreaded surfaces, then through one of said groups of external thread turns, then bridging across said annular groove, then through the second group of said thread turns and then through te second of said unthreaded surfaces.

2. The combination comprising an element as recited in claim 1, and a locking key driven axially into said first groove and continuing through both of said unthreaded surfaces and both groups of thread turns and bridging across said annular second groove.

References Cited in the file of this patent

UNITED STATES PATENTS

| 2,400,348 | Greene | May 14, 1946 |
| 2,742,074 | Rosan | Apr. 17, 1956 |
| 2,754,871 | Stoll | July 17, 1956 |
| 2,815,058 | Neuschotz | Dec. 3, 1957 |